J. L. G. DYKES.
TIRE BAND MAKING MACHINE.
APPLICATION FILED SEPT. 29, 1917.
1,370,100.
Patented Mar. 1, 1921.
5 SHEETS—SHEET 5.
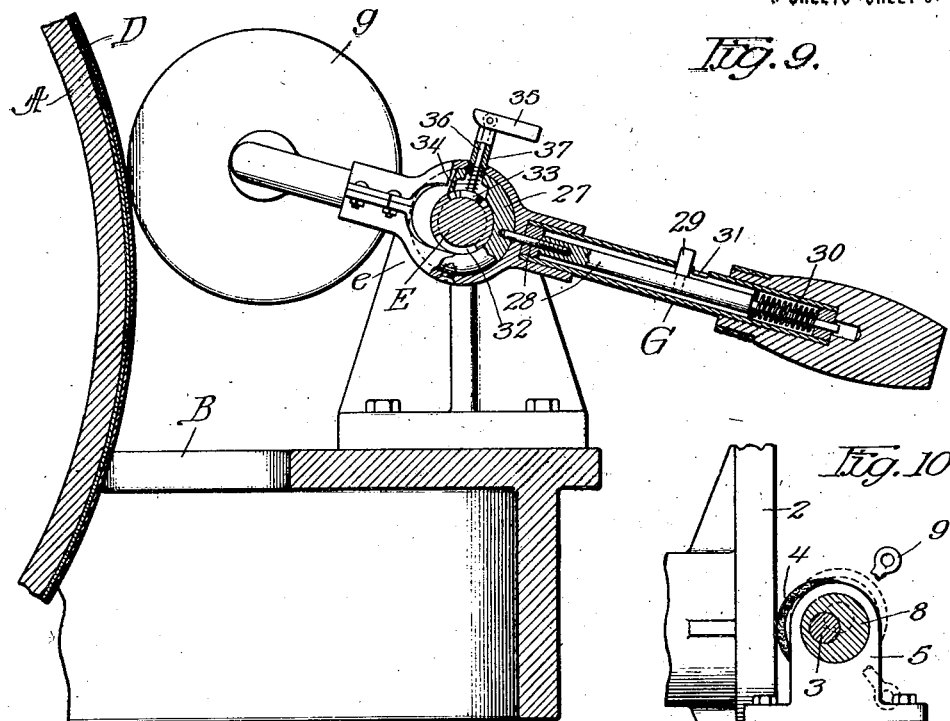
Fig. 9.
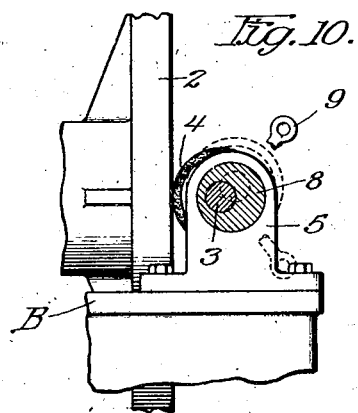
Fig. 10.
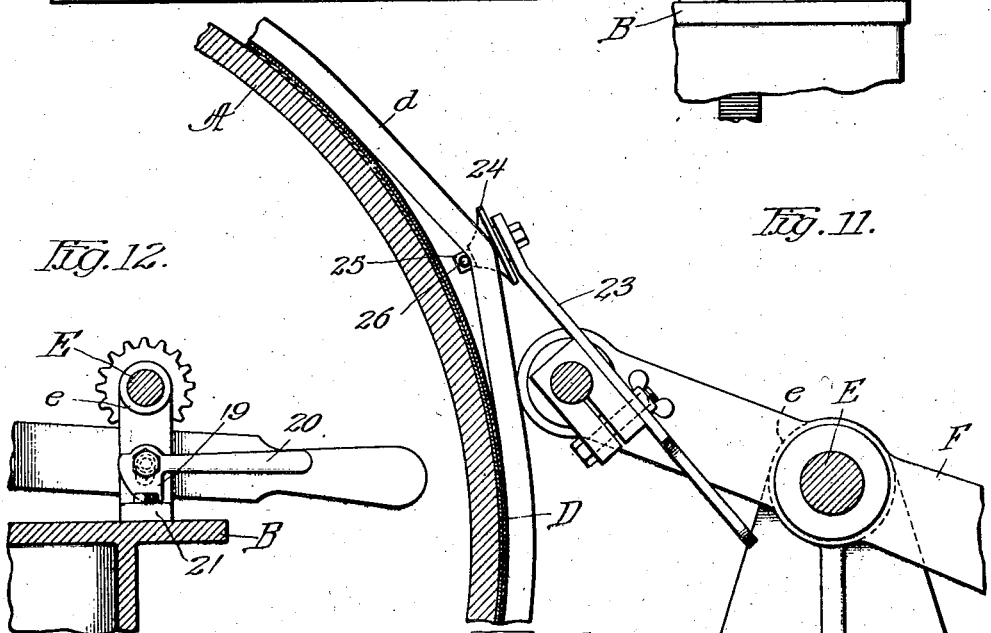
Fig. 12.
Fig. 11.
Witnesses:
Inventor
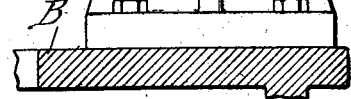

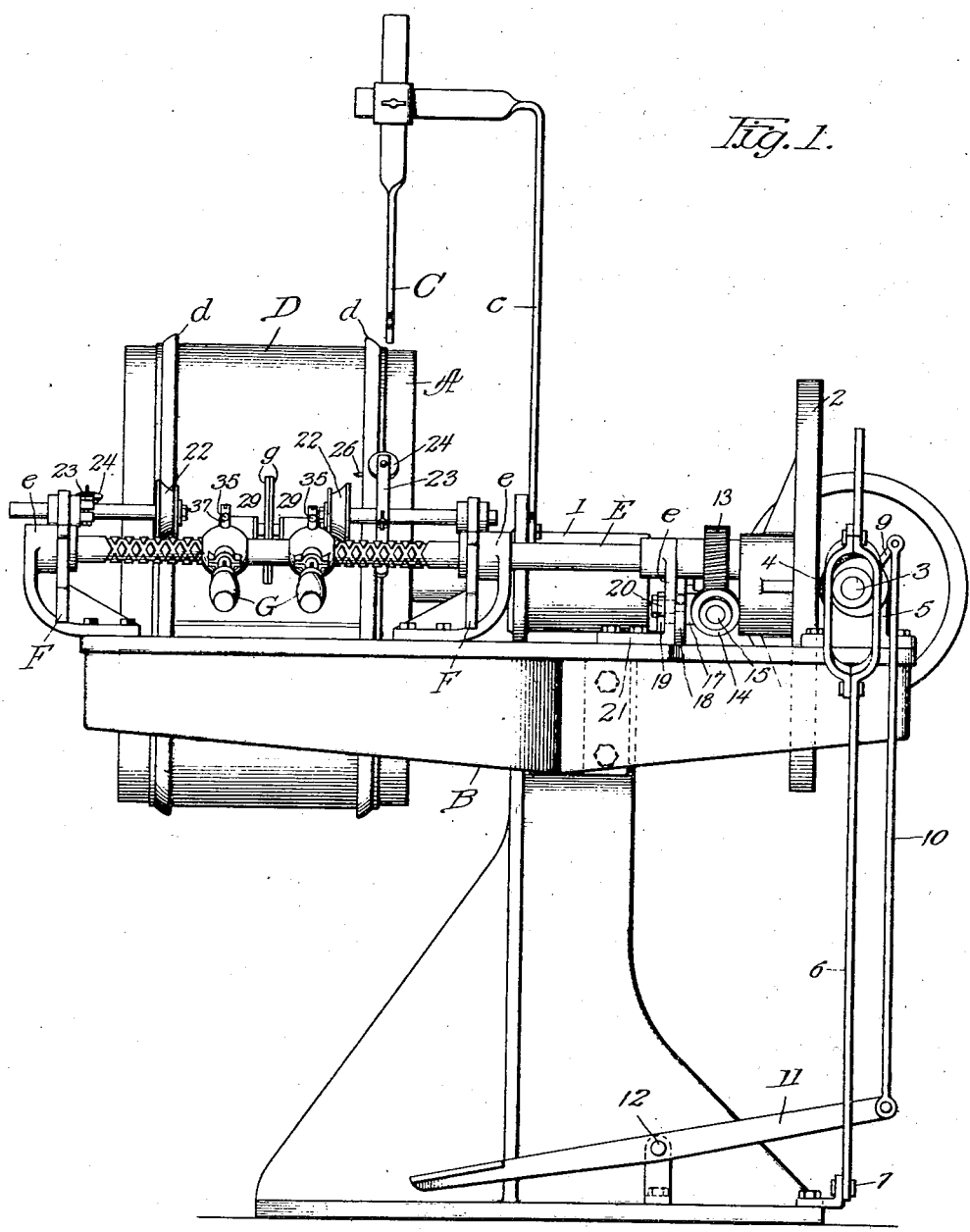

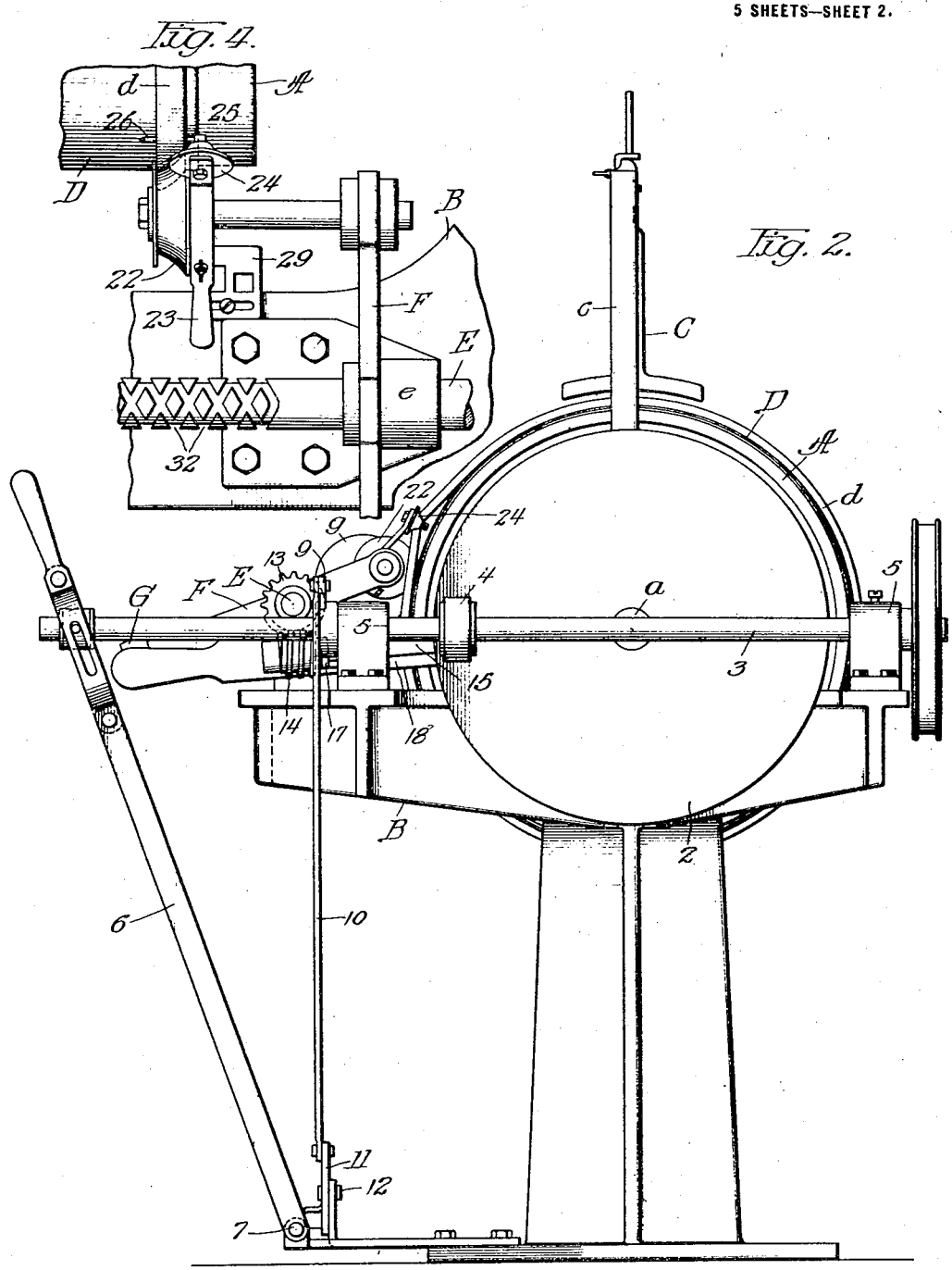

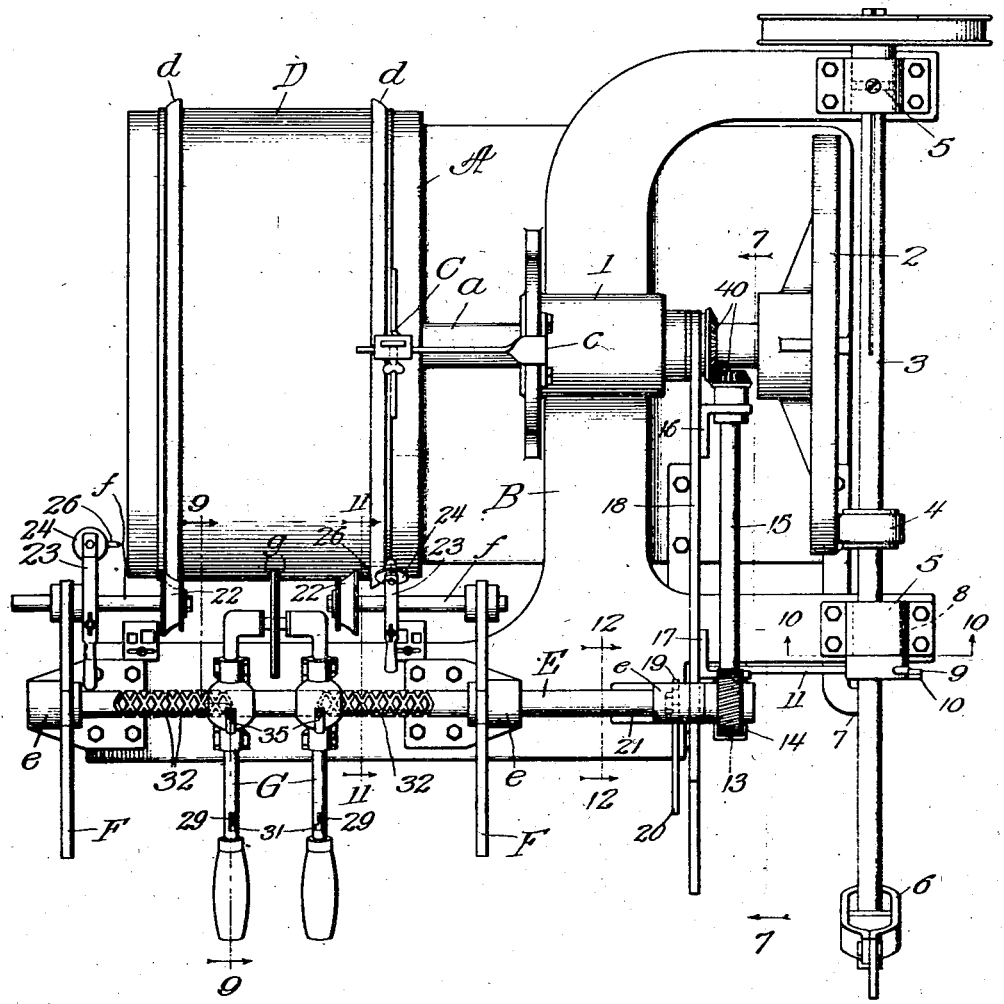

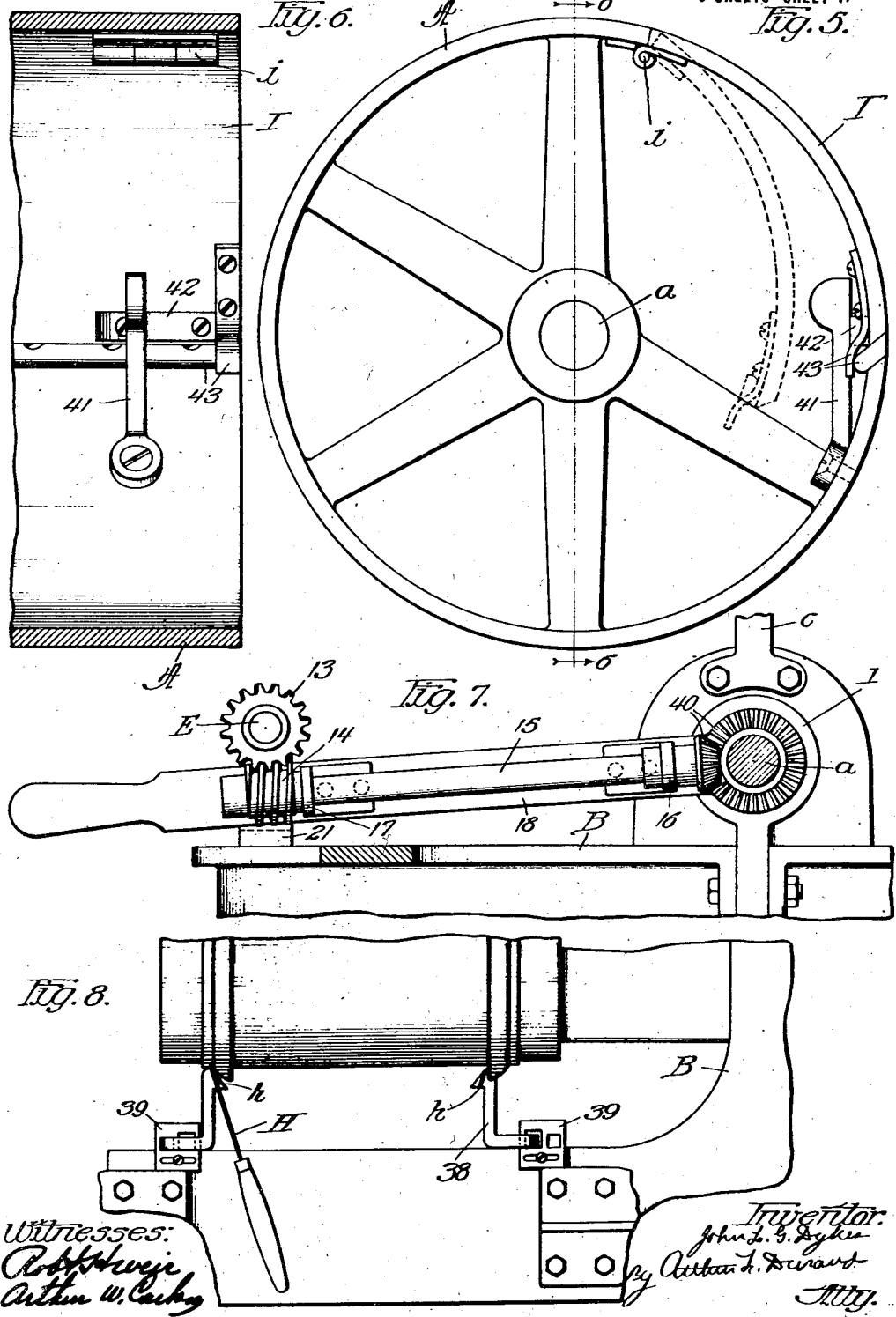

UNITED STATES PATENT OFFICE.

JOHN L. G. DYKES, OF CHICAGO, ILLINOIS, ASSIGNOR TO ERNEST HOPKINSON, OF NEW YORK, N. Y.

TIRE-BAND-MAKING MACHINE.

1,370,100.  Specification of Letters Patent.  Patented Mar. 1, 1921.

Application filed September 29, 1917.  Serial No. 193,978.

*To all whom it may concern:*

Be it known that I, JOHN L. G. DYKES, a citizen of the United States of America, and resident of Chicago, Cook county, Illinois, have invented a certain new and useful Improvement in Tire-Band-Making Machines, of which the following is a specification.

My invention relates to machinery for making pneumatic tires by the method claimed broadly in my prior application No. 184,197, and which involves, first, the making of a band of fabric and rubber and, second, the stretching of the band into the shape desired for pneumatic tires. As herein shown and described, my invention contemplates a machine having a rotary drum upon which the bands are formed, the sheet material being applied to the outer surface of the drum, and tightly held thereon, and devices being provided to engage the materials and thereby coöperate with the drum in forming the band. Means are also provided, according to my invention, to form beads along the opposite edges of the band, thereby to form rim portions for the tire. With a machine of this kind, the bands are easily and rapidly made, in the desired shape, so that they may thereafter be stretched into the form desired for the pneumatic tires, and then vulcanized in any suitable known or approved manner.

To these and other useful ends, my invention consists in matters hereinafter set forth and claimed.

In the accompanying drawings:

Figure 1 is a side elevation of a band-making machine embodying the principles of my invention.

Fig. 2 is an end elevation of said machine.

Fig. 3 is a plan of said machine.

Fig. 4 is an enlarged detail view showing one method of using certain of the devices which engage the materials to coöperate with the drum in forming the band.

Fig. 5 is an enlarged side elevation of the drum.

Fig. 6 is a vertical section on line 6—6 in Fig. 5.

Fig. 7 is an enlarged vertical section on line 7—7 in Fig. 3.

Fig. 8 is an enlarged plan view of certain portions of the machine, showing the devices for trimming the band.

Fig. 9 is an enlarged section on line 9—9 in Fig. 3.

Fig. 10 is an enlarged detail section on line 10—10 in Fig. 3.

Fig. 11 is an enlarged section on line 11—11 in Fig. 3.

Fig. 12 is an enlarged section on line 12—12 in Fig. 3.

As thus illustrated, my invention comprises a rotary drum A mounted upon a horizontal shaft $a$, which latter is supported for rotation in the bearing 1 mounted on the body frame B of the machine. In this way the drum is supported at one side only, and left with clearance at its other side or end, so that the finished band can be removed from the drum. The other end portion of this shaft is provided with a friction disk 2, and a shaft 3 (which extends at right angles to the shaft $a$) is provided with a roller 4 to engage said disk, said shaft 3 being mounted to slide endwise in the bearings 5 on the body frame, so that the roller 4 is movable across the face of said disk. A hand-lever 6 is pivoted at 7 on the base of the body frame and is suitably connected to the shaft 3 to shift the latter endwise. The bearings 5 are preferably of the kind shown in Fig. 10, each bearing comprising an eccentric 8 which is rotatable in the bearing, and which supports the shaft, whereby rotation of these eccentrics will move the roller 4 toward and away from the friction disk, thereby to start and stop the machine. For this purpose, the shaft 3 is provided with a crank arm 9 connected by a rod 10 with the foot-lever 11, which latter is pivoted at 12 on the base of the body frame, so that by operating this foot-lever the eccentrics 8 are oscillated to move the shaft 3 toward and away from the disk 2, thus opening and closing the variable speed friction drive transmission, it being observed that the movement of the roller 4 toward and away from the center or axis of the disk 2 will change the speed of the drum A, and that movement of this roller past the center of the disk will reverse the rotation of the drum.

A gage C is adjustably mounted on the upright bracket $c$, which latter is suitably supported on the body of the machine. This gage is movable laterally and also up and down, so that it can be used to determine the correct position of one edge of the band D on the drum. It will be understood that this band can be made of superimposed sheets of fabric and rubber, or any other suitable sheet materials, the annular band being slipped over the outer end of the drum until the edge of the band is in line with said gage.

Certain devices are provided for engaging the materials of which the bands are made to coöperate with the drum in properly shaping or forming each band, as follows:—
A transverse shaft E is suitably supported in bearings e on the body frame, so as to rotate about an axis parallel with the axis of the drum, and directly in front of the latter. This shaft is provided with a worm-wheel 13 for engaging the worm or screw 14 on the shaft 15, which latter is supported for rotation in bearings 16 and 17 on the hand-lever 18, which latter is mounted to swing up and down on the shaft a, thereby to open and close said worm-gear at will, thus controlling the rotation of the shaft E whenever such is necessary or desirable. To lock the worm-gear in closed condition, a hand-lever 18 is provided with a pivoted cam 19 having a handle 20 for the operation thereof, and this cam is adapted to engage the shoulder 21 on the bearing e in which the shaft E is mounted at one end thereof. The hand-levers F are mounted on said shaft E adjacent the bearings e, so that they tilt about the axis of said shaft E, each hand-lever having its inner end provided with a transverse shaft or spindle f which is mounted to slide endwise. These shafts f extend toward each other, it will be seen, close to the cylindric surface of the drum and are provided at their inner ends with rollers 22 which are shaped in any suitable manner to engage the beads d of the band, thereby to press these beads firmly against the band and cause them to adhere thereto, it being understood that these beads are ordinarily made of rubber or of rubber and fabric, and all of the rubber of the band is, of course, in a raw or practically raw or uncured condition, so that the superimposed sheets and the two beads will adhere together. Each shaft f is provided with a tilting handle 23, which is adjustable along the shaft f to any desired position thereon, depending upon the width of the band. Each handle 23 forms a hand-lever, it will be seen, is provided at its upper end with a grooved or suitably formed roller 24, these two rollers rotating about axes that extend at right angles to the shaft a, whereas the rollers 22 rotate about axes which are parallel to said shaft. The studs 25 upon which the rollers 24 rotate are provided at their inner ends with pins 26, these pins extending toward each other, whereby guides are formed for the beads d, the pins 26 serving to lift or stretch the beads outwardly a distance from the band, and the rollers 24 serving to correctly position the beads on the band. Afterward the rollers 22 are applied to the beads to compress them against the band; or, as shown in Fig. 4, the rollers 22 can be caused to engage the beads at the same time that the latter engage the rollers 24, so that as fast as the beads are correctly positioned they are pressed against the band, the drum rotating in the direction indicated by the arrows in Figs. 2 and 11; but it will be understood that these devices for running on and shaping the beads can be manipulated in various ways to accomplish the desired purpose. Furthermore, two tilting handles G are mounted on the shaft E, between the bearings e, and are provided at their inner ends with disks or thin rollers g (sometimes called stitchers) for compressing and kneading and working the different portions of the band between the two beads, during the rotation of the drum, thereby to cause the materials to assume the desired condition. Each hand-lever G is mounted upon a ball 27, so that either lever can be moved sidewise to position the disk or rollers g obliquely relative to the drum, and whereby the materials can be worked or crowded around in the desired manner. For example, it is desirable to stretch the band laterally, to some extent, after it is on the drum, which tends to reduce the diameter of the band and thereby cause it to tightly hug the drum. Each handle is provided with a locking device 28 for locking the handle to the ball 27, but this locking device can be withdrawn by placing the thumb on the knob or projecting portion 29, so as to retract the locking device against the tension of the spring 30 in the handle; then by slightly rotating the knob 29 the latter will be forced into the notch 31 in the handle shank, thus retaining the locking device in its retracted position. Also, in order that the handles G and their disks g may be moved laterally back and forth, automatically, on the shaft E, the latter is provided with cam-grooves 32, these grooves being spiral, and each groove extending backward over itself. Each ball 27 is provided with engaging portion 33 subject to the pressure of a spring 34 to hold it in the adjacent cam-groove on the shaft, and in this way the rotation of the shaft E will cause the balls 27 and the handles supported thereby to travel back and forth on the shaft, in a manner that will be readily understood. However, when it is desired to disconnect these handles from the cam-grooves in order that said handles and their disks g may be manipulated laterally at will, the engaging portions 33 are withdrawn from the cam-grooves by lifting the short cam-levers 35 to the upper ends of which the stems 36 of the engaging portions 33 are pivotally connected, these cam-levers having their ends shaped to act upon the tops of the tubes 37 in which the stems 36 are inclosed. Therefore, when the levers 35 are lifted the portions 33 are withdrawn from the cam-grooves, thus releasing the handles G from said grooves.

It is also desirable to trim the edges of the band before it leaves the drum. This is accomplished by means of a knife H held in either one of the grooves $h$ formed in the ends of the brackets 38, which latter are removably supported on the adjustable plates 39, the latter being suitably secured to the body frame of the machine. It will be seen that these grooves $h$ are disposed at angles, so that the knife H will be held at the proper angle to trim the edges of the band and provide clean beveled edges therefor.

Any suitable means can be employed for rotating the shaft 15, but this is preferably accomplished by bevel gears 40 between the end of this shaft and the shaft $a$, whereby the shaft 15 is rotated at somewhat higher speed than the shaft on which the drum is mounted.

In order that the band, when finished, may be easily removed from the drum, the latter is preferably provided with a movable section I which is hinged at $i$ to swing inward toward the axis of the drum, so that the effect will be to flatten the drum at one side, thereby loosening the band on the drum and facilitating the removal thereof. Any suitable means can be employed for locking the section I in position to maintain the cylindric continuity of the band. For example, the inner circumference of the drum may be provided with a pivoted latch 41, and the section I may be provided with a strip 42 upon the surface of which the latch slides when the movable section is locked in position. Stops 43 limit the outward swinging movement of the section I, so that its outer surface is held flush with the outer surface of the body portion of the drum. Thus, when the band is finished the latch 41 is forced off from the strip 42, thereby unlocking the swinging section I of the drum, and allowing the band to flatten at one side, so that it becomes loose on the drum. The completed band is then easily slipped off from the outer end of the drum.

The band D can be of any suitable or desired thickness, and is built up by applying sheets of rubber to layers of fabric, the latter being preferably cut on the bias, so that the band is capable of stretching. The inner surface of the band is flush with the edges thereof, as the beads are on the outside of the band, so that the edges of the band are flush with the inner surface, and the periphery of the drum conforms to this inner flush or flat surface of the band. By slight lateral stretching of the band, thus made of rubberized fabric, or fabric and rubber, or any other suitable materials, while it is being formed, it is tightened on the drum, thus insuring the conditions which will facilitate the work and produce the best results.

With the foregoing construction and arrangement, it will be seen that the tire band is of less width than the drum A, so that the band is stretched out flatwise from one edge thereof to the other, so that the band, when viewed in cross-section, is entirely flat inside and ribbed on the outside; and it will be understood, of course, that between the two ribs $d$ there will be the additional thickness required for the tread of the tire. These ribs $d$ form the beads or reinforced edges for the tire, after the band is stretched into shape to form the tire casing and then vulcanized. The manually controlled devices enable the operator to work or knead or manipulate the layers of fabric and rubber, to cause them to adhere in the required manner, and to produce the requisite thicknesses at different points in the band, and for the purpose of properly shaping the ribs or beads at the edges of the bands, as previously explained.

What I claim as my invention is:

1. A machine for making bands, comprising a rotary drum to receive the materials and form the band, manually controlled devices to engage said materials, and to thereby coöperate with said drum in forming the band, and mechanism to rotate said drum, said devices including a tilting handle having means to engage the band, a shaft to support said handle and provided with a cam-groove to shift the handle back and forth thereon, and manually operable means to connect the handle with said groove and disconnect it therefrom at will, said handle being freely movable laterally when disconnected from said groove.

2. A machine for making bands, comprising a rotary drum to receive the materials and form the band, manually controlled devices to engage said materials, and to thereby coöperate with said drum in forming the band, and mechanism to rotate said drum, said devices including a tilting handle, a pivoted member carried by said handle, a roller and a pin on said member to coöperate in positioning a bead on the band, and a roller carried by said handle to press the bead onto the band.

3. A machine for making bands, comprising a rotary drum to receive the materials and form the band, manually controlled devices to engage said materials, and to thereby coöperate with said drum in forming the band, and mechanism to rotate said drum, a shaft to support and operate one or more of said devices, a worm-gear to connect said shaft with said mechanism, and means to open and close said worm-gear to control the rotation of said shaft.

4. In a machine for use in making pneumatic tire casings, means for holding and moving the sheet materials from which to make the casing, so that said materials will assume the form of an endless band and with drums for the free removal of said band, a disk rotatable about an axis parallel with the axis of the band and arranged for engaging and kneading and shaping the sheet materials, a handle to manipulate and control said disk, and mechanism to permit up and down and sidewise movement of said handle, under the control of said handle.

5. In a machine for use in making pneumatic tire casings, the combination of means for holding the materials from which to make the casing, so that said materials will assume the form of an endless band and with drums for the free removal of said band, a device for guiding a bead onto the band, means to manually manipulate and control said device, a roller rotatable about an axis parallel with the axis of the band and arranged to press the bead and shape it on the band, means to control said roller independently of said device, a tilting member to support said roller, and a tilting handle on said member to support said device.

6. A structure as specified in claim 5, said device comprising a roller mounted to rotate about an axis at right angles to the axis of the other roller, and mechanism whereby both of said rollers are movable laterally.

7. In a machine for making tire bands, the combination of a rotary drum to support the materials from which to form the band, means to support the drum so that the band can be removed, a pair of tilting and laterally movable handles provided with disks rotatable about an axis parallel with the axis of the band and arranged to engage the materials, a pair of tilting handles having rollers to assist in forming beads on the edge portions of the band, another pair of handles for controlling two of said rollers independently of the other rollers, and mechanism whereby said first mentioned handles and said disks are subject to control by the operation of said drum.

8. In a machine for making tire bands, the combination of a drum having a cylindric surface which is fully as wide as the bands to be made thereon, so that the band in cross-section is straight and flat inside from one edge thereof to the other, means to support the drum so that the band can be removed, devices disposed in operative relation to said drum to shape the outside of the band and to form beads on the edge portions thereof, so that all portions of the band are of greater diameter than the cylindric surface whereon it is formed, and handles for manually manipulating and controlling said devices at will, which handles are movable about axes that are parallel with the axes of the drums.

9. In a machine for making tire bands, the combination of a movable support for the band, a rotary shaft to operate said support, an auxiliary shaft arranged parallel with said shaft, a third shaft disposed at right angles to the other two shafts, power-transmitting connection between the first-mentioned shaft and the third shaft, a hand lever mounted to tilt about said first mentioned shaft, bearings on said hand lever to support the third shaft, worm gearing between said third shaft and said auxiliary shaft, said worm gearing being opened and closed by movement of said hand lever, and means carried by said auxiliary shaft to operate on the materials during the formation of the band.

10. In a machine for making tire bands, the combination of a movable support for the band, a shaft to operate said support, a friction disk on said shaft, a second shaft disposed at right angles to said first mentioned shaft and extending across the face of said disk, a roller fixed on said second shaft to engage the face of said disk, instrumentalities for reciprocating the second shaft endwise and thereby shifting said roller toward and away from the center of said disk to vary the speed of said support, and a single bearing for said first mentioned shaft disposed between the support and the disk.

11. In a machine for making tire bands, in combination with a movable support for the band, a hand lever mounted in operative relation to said support to tilt about an axis, a roller carried by said hand lever to engage a bead on the band, means for operating said support to keep the band in motion while said roller is operating thereon, an auxiliary hand lever mounted to tilt about the axis of said roller, and a second roller mounted on said auxiliary hand lever to engage the bead, the axis of the second roller being disposed at right angles to the axis of the first roller, and both rollers and the auxiliary hand lever being carried by the first mentioned hand lever.

12. In a machine for making tire bands, in combination with a movable support for the band, a shaft having cam grooves, a sleeve on said shaft, means in said sleeve to engage said cam grooves, a hand lever mounted on said sleeve in operative relation to said support, means for releasing the sleeve from said cam grooves, means in said hand-lever for locking the sleeve thereto and for unlocking the hand lever to permit lateral tilting motion thereof, means to operate said support to keep the band in motion and means on the end of said hand-lever to engage the moving band.

13. A structure as specified in claim 9, in combination with a cam pivoted on said hand-lever, having a handle for the operation thereof, and means to engage said cam to maintain said worm gearing closed.

14. A structure as specified in claim 10, in combination with an eccentric bearing for said second shaft, and means for adjusting said eccentric bearing to vary the pressure of said roller against said disk.

15. A structure as specified in claim 11, in combination with a pin associated with the second roller to extend under the bead on the band.

16. In a machine of the class described, the combination of a cylindric drum upon which to form an endless band, a shaft to support said drum, a friction disk on said shaft, a driving shaft disposed across the face of the disk, a roller on said driving shaft to engage said disk, means to reciprocate the driving shaft endwise to vary the speed of the drum, an eccentric device to regulate the pressure of the roller against the face of the drum, and means coöperating with the drum to form the band.

17. In a machine for making tire bands suitable for conversion into pneumatic tire casings, the combination of a rotary cylindric drum adapted to receive and carry the materials thereon to form an endless band which fits the drum, the periphery of the drum being flat in cross section and wider than the band, to hold the band flat in cross section, manually controlled devices which are shiftable at will in directions parallel with the axis of the drum and adapted to engage said materials, after the materials have been placed in proper relation on the drum, to coöperate with said drum in compressing and kneading and forming the materials into a band having a tread portion and thickened edges, and mechanism to rotate the drum and band in unison, said drum being supported at one side only to permit removal of the endless band therefrom at the other side thereof.

18. A machine as specified in claim 17, said mechanism including an adjustable friction-drive to change the speed of said drum and reverse the rotation thereof.

19. A machine as specified in claim 17, said drum having a movable section to facilitate the removal of the band.

20. A machine as specified in claim 17, and means operated by said mechanism to support and automatically shift said devices, in addition to said manual control thereof.

21. A machine as specified in claim 17, said devices including rollers which are formed to apply beads to the opposite edge portions of the band to form said thickened edges.

22. A machine as specified in claim 17, said devices including a plurality of rollers and handles for pressing said rollers against the band.

23. A machine as specified in claim 17, said drum having a section thereof hinged on the inner circumference of the drum to swing inward to loosen the band on the drum, and means to lock the distal end of said swinging section in position to preserve the continuity of the drum and keep the band tight and smooth during the making thereof.

24. A machine as specified in claim 17, and means to trim the edges of the band during the rotation thereof with the drum.

25. A machine as specified in claim 17, and a transverse shaft upon which said devices are mounted to be tilted manually about an axis parallel with the axis of said drum.

26. A machine as specified in claim 17, and a gage to determine the correct position of one edge of said band on the drum a distance from the edge thereof.

27. A machine as specified in claim 17, said devices comprising a hand-lever mounted to rock up and down and to skew sidewise, and means on said hand-lever to engage the band.

28. In a machine for use in making pneumatic tire casings, the combination of a rotary drum arranged in position to receive sheet material, means to rotate said drum, and devices adapted to operate upon said sheet material and to be shifted around on the band between the edges thereof to compress the layers of sheet material together and to reduce the same to the form of a band, which is, when viewed in cross section, flat inside and ribbed on the outside to form a tread portion between two external ribs forming the edges of the casing.

29. A structure as specified in claim 4, and devices whereby said mechanism is subject to control by said means.

Signed by me at Chicago, Cook county, Illinois, this 15th day of September, 1917.

JOHN L. G. DYKES.